United States Patent
Johnson et al.

(10) Patent No.: US 8,676,931 B1
(45) Date of Patent: Mar. 18, 2014

(54) METHODS FOR MANAGING MANUAL CHANGES TO NETWORK INFRASTRUCTURES THROUGH AUTOMATED SYSTEMS

(75) Inventors: Eric Wendell Johnson, Redmond, WA (US); Ajay K. Gummadi, Bellevue, WA (US); Matthew Von Bargen, Kirkland, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1961 days.

(21) Appl. No.: 11/544,185

(22) Filed: Oct. 6, 2006

Related U.S. Application Data

(60) Provisional application No. 60/724,354, filed on Oct. 6, 2005.

(51) Int. Cl.
*G06F 15/16* (2006.01)
*G06F 15/177* (2006.01)
*G06F 15/173* (2006.01)

(52) U.S. Cl.
USPC ........................... 709/219; 709/221; 709/223

(58) Field of Classification Search
USPC ......................... 709/219–223, 224
See application file for complete search history.

(56) References Cited

U.S. PATENT DOCUMENTS

| | | | |
|---|---|---|---|
| 7,483,394 B2 * | 1/2009 | Chang et al. ................... | 370/254 |
| 7,483,965 B1 * | 1/2009 | Gerraty ........................ | 709/221 |
| 7,590,669 B2 * | 9/2009 | Yip et al. ..................... | 707/203 |
| 2002/0018484 A1 * | 2/2002 | Kim ............................. | 370/432 |
| 2003/0055919 A1 * | 3/2003 | Fong et al. .................... | 709/220 |
| 2003/0220991 A1 * | 11/2003 | Soejima et al. ................ | 709/221 |
| 2005/0201299 A1 * | 9/2005 | Radi et al. .................... | 370/254 |
| 2006/0031427 A1 * | 2/2006 | Jain et al. ..................... | 709/220 |

* cited by examiner

*Primary Examiner* — Joshua Joo

(57) ABSTRACT

Network automation systems, and methods of implementing planned changes to a network infrastructure are provided. A network automation system includes software configured to model a manual change of the planned change and identify a conflict between the manual change and another change of the planned change. The system also includes a policy module configured to verify that the changes of the planned change conform to a policy. The system further includes a device proxy configured to allow a user to implement the manual change. An exemplary method for implementing the planned changes includes modeling a manual change of the planned change, checking for a conflict between the manual change and another change, and implementing the planned change. The method can also include verifying that the manual change complies with a policy.

16 Claims, 3 Drawing Sheets

METHODS FOR MANAGING MANUAL CHANGES TO NETWORK INFRASTRUCTURES THROUGH AUTOMATED SYSTEMS

CROSS-REFERENCE TO RELATED APPLICATIONS

This application claims the benefit of U.S. Provisional Patent Application No. 60/724,354 filed on Oct. 6, 2005 and entitled "Method and System for Managing Manual Changes on Network Devices."

BACKGROUND OF THE INVENTION

1. Field of the Invention

The present invention relates generally to the field of computer networks and more particularly to methods for making both manual and automated changes to network infrastructures through network automation systems.

2. Description of the Prior Art

Traditionally, a network infrastructure configuration change was made manually, either by logging into a specific device's Command Line Interface (CLI), or by using various Element Management Systems (EMS) dedicated to the devices from a specific vendor or product line. Increasingly, however, changes are being made using multi-vendor network automation systems. These systems can provision changes spanning both multiple devices and multiple types of devices in an automated fashion. In addition to automation, a network automation system offers other significant benefits, including increased security and compliance with corporate policies by enforcing defined privileges or authorization levels in the organization, and also ensuring adherence to the corporate workflow, notification and approval policies.

Network automation systems have not entirely obviated the need for manual changes, however. Many organizations prefer that an expert engineer manually implement certain changes. These changes can include those that are highly sensitive, highly timing dependent, require trial and error to determine the exact changes necessary to achieve a desired effect, etc. One common scenario is to use a network automation system to automatically provision a set of devices, for example the devices of a new branch office, and then have an engineer review how the devices have been provisioned and then to manually make one or more final changes.

Presently, no network automation system manages both manual and automated changes, orchestrates operations that involve both manual and automated changes, and achieves the process assurance and privilege level benefits of a network automation system for manual changes as well as for automated changes. Therefore, even when an automation system is adopted, Information Technology (IT) organizations are not able to achieve full assurance and compliance with defined authorization levels, policies, and processes, since changes made manually circumvent the protections of the network automation system.

SUMMARY

The present invention provides methods for implementing changes to a network infrastructure. An exemplary method comprises specifying a planned change including a manual change and another change to the network infrastructure, modeling the manual change, checking for a conflict between the manual change and the other change, and implementing the planned change. The other change can be another manual change or an automated change, for example. In some embodiments the method further comprises a user connecting to a device proxy prior to implementing the planned change. In these embodiments, the method can further comprise verifying that the manual change complies with a policy. Implementing the planned change, in some embodiments, can include restricting a user's ability to implement the manual change based on the user's privilege level. In those embodiments where the other change is an automated change, implementing the planned change can include verifying that the automated change complies with a policy.

The present invention also provides network automation systems for implementing changes to a network infrastructure. An exemplary network automation system comprises software configured to model a manual change of a planned change and identify a conflict between the manual change and another change of the planned change, a policy module configured to verify that the changes of the planned change conform to a policy, and a device proxy configured to allow a user to implement the manual change. In some embodiments the network automation system further comprises a user permissions manager in communication with the policy module. The network automation system can further comprise a workflow process and approval engine in communication with the policy module. The network automation system can further comprise a deployment engine for implementing an automated change of the planned change, in some embodiments. Additionally, the network automation system can further comprise a manual emergency override configured to bypass the policy module and the modeling and conflict identification software.

DETAILED DESCRIPTION OF THE INVENTION

The present invention provides methods for incorporating manual changes within network automation systems, for orchestrating manual and automated changes, and for applying permission and process controls equally to both changes. Thus network organizations can be assured that all changes made to the network infrastructure comply with defined policies and processes. It is noted that this paradigm can be applied to any IT management discipline.

Figure 1:
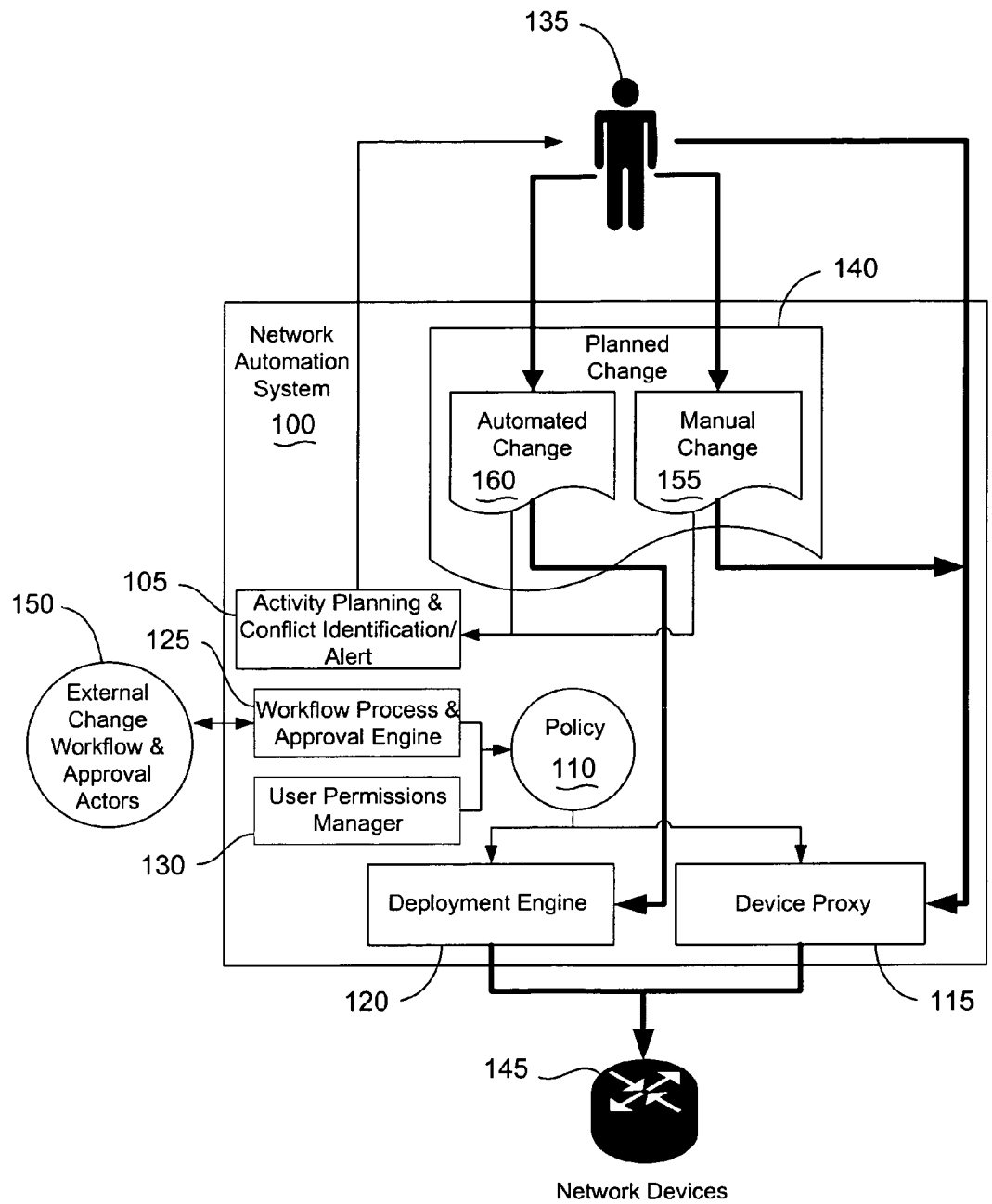
FIG. 1 is schematic representation of a network automation system according to an embodiment of the present invention.

FIG. 1 is a schematic representation of an exemplary network automation system 100 according to an embodiment of the present invention. The network automation system 100 comprises a software application for providing network configuration management and automation capabilities for a network infrastructure. The operation of the network automation system 100 will be described below with respect to FIGS. 2 and 3. The network automation system 100 comprises software components 105, a policy module 110, a device proxy 115, and a deployment engine 120. Policy module 110 relies upon workflow process and approval engine 125 and user permissions manager 130.

A user 135, such as a network engineer, uses the network automation system 100 to implement planned changes 140 in a network infrastructure of network devices 145. The network devices 145 can include routers, switches, wireless devices, content switches, firewalls, access points, and other components that are used to provide connectivity and network services. Changes to the network infrastructure of network devices 145 are implemented via configuration and software changes on one or more of the network devices. External change workflow and approval actors 150 represents other users and external applications that can be used to manage planned changes 140 through the design and implementation process, including sending appropriate notifications and gathering required approvals.

Planned change 140 comprises a defined and actionable set of operations designed to affect a set of desired changes in the network infrastructure. The planned change 140 can include either or both of a manual change 155 and an automated change 160. The planned change 140 can also include multiple manual and/or automated changes. The manual change 155 is a change affecting one or more network devices 145 that is implemented manually by user 135 with the assistance of the network automation system 100 via such means, for example, as a network device's CLI. The automated change 160 is a change affecting one or more network devices 145 that is implemented by the network automation system 100 via automated means, such as configuration deployment, scripts, software updates, and so forth.

Software components 105 perform functions relating to activity planning, conflict identification and alerting. Accordingly, software components 105 are configured to identify potential conflicts between various manual and/or automated changes 155, 160 of the planned change 140, alert appropriate parties, such as the user 135, to prompt conflict resolution, and provide an interface for viewing the planned change 140, for example via a Calendar UI.

One function of the network automation system 100 is to ensure that any change 155, 160 made to the network devices 145 conform to policy. Policy module 110 integrates the corporate and other policies, processes, approvals, privileges, and requirements which constrain the application of the planned change 140 to the network devices 145. These limitations are supplied by the workflow process and approval engine 125 and user permissions manager 130.

The workflow process and approval engine 125 is a set of software components that manage one aspect of corporate policy, namely change processes and approvals. The workflow process and approval engine 125 identifies the set of processes that apply to a given manual or automated change 155, 160, manages the change 155, 160 across the identified processes, mediates with the external change workflow and approval actors 150 that participate in each process, and for automated changes 160 ultimately releases a change request to the deployment engine 120 when the necessary approvals have been obtained.

The user permissions manager 130 a set of software components that manage authorizations, privileges, and permissions. The user permissions manager 130 is responsible for identifying the actions, devices, and system objects that are permitted to a given user 135, and for granting or denying access to those resources based on the user's privilege levels. In some embodiments, the user permissions manager 130 also has responsibility for related issues such as user authentication, user grouping, inheritance of roles and permissions, and so forth.

The deployment engine 120 is a set of software components that is responsible for deploying automated changes 160 to one or more of the network devices 145, via such automated means as configuration deployments, scripts, software updates, etc. Likewise, the device proxy 115 is a set of software components which proxy, or pass-through, manual changes 155 to one or more of the network devices 145. The device proxy 115 can support, in various embodiments, a variety of popular mechanisms for making manual changes, such as CLI (Telnet, SSH, RSH, Console, etc.), File (FTP, TFTP, SCP, RCP, etc.), HTTP, XML, SNMP, proprietary interfaces, etc. The device proxy 115 presents the user 135 with the customary and preferred interfaces for making manual changes, with a minimum of modification. Additionally, the device proxy 115 uses the policy module 110 to ensure that the manual changes 155 conform to all applicable policies. It is noted that the device proxy 115 need not be limited to any specific set of management protocols.

Figure 2:
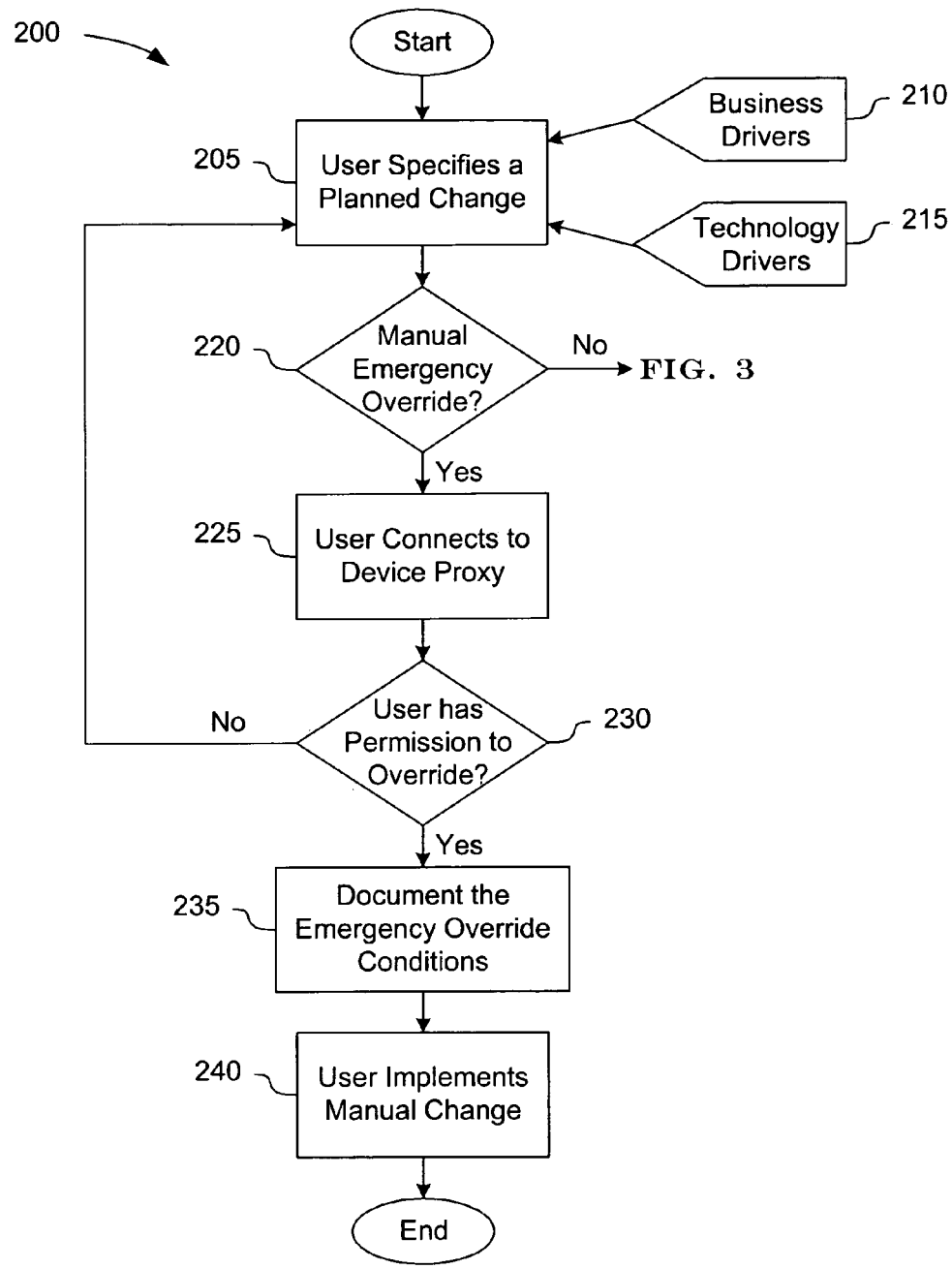
FIG. 2 is a flowchart representation of a method for implementing a planned change to a network infrastructure according to an embodiment of the present invention.
Figure 3:
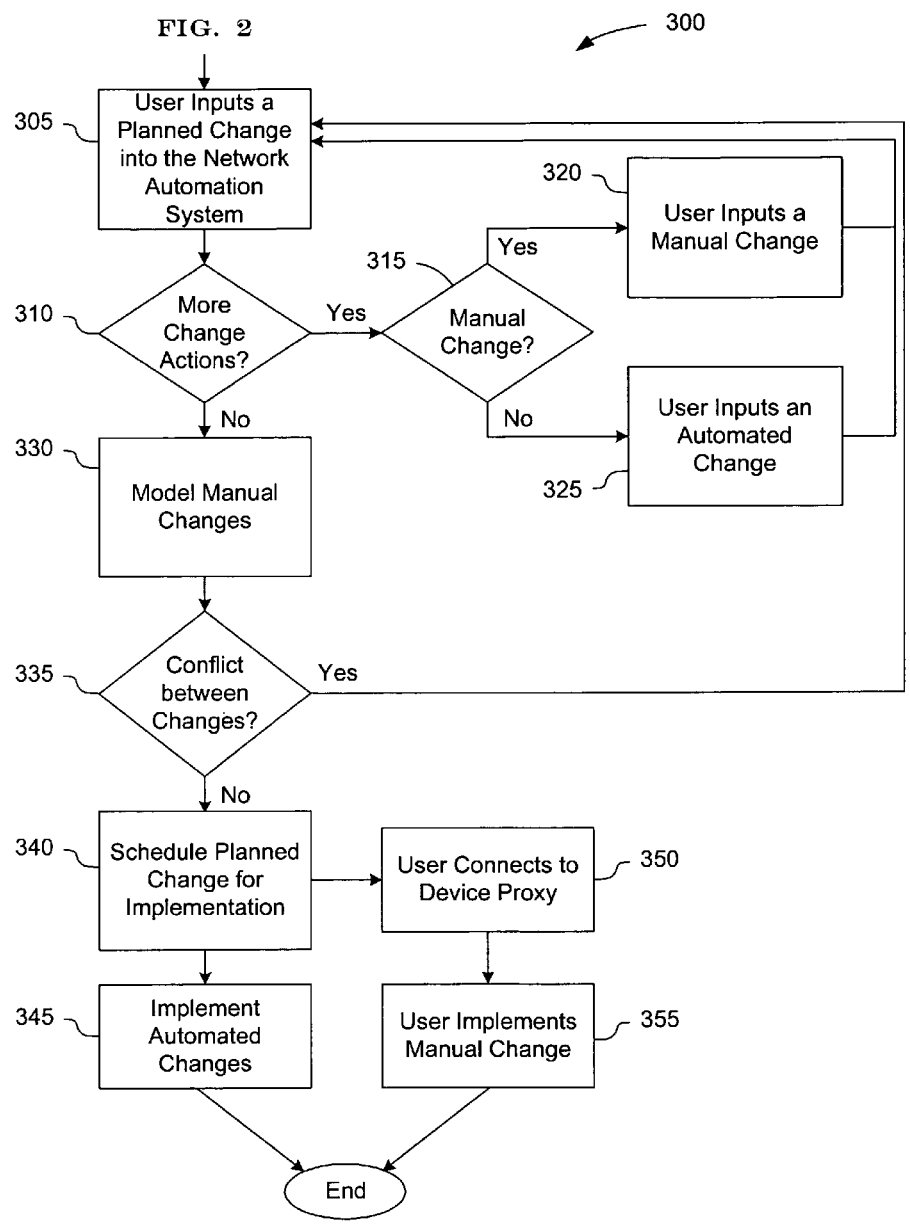
FIG. 3 is a flowchart representation of another method for implementing a planned change to a network infrastructure according to an embodiment of the present invention.

FIGS. 2 and 3 illustrate an exemplary method 200 for managing a planned change 140 (FIG. 1) according to an embodiment of the present invention. The method 200 begins with a user, such as user 135 (FIG. 1), specifying 205 a planned change to the network infrastructure of network devices. Specifying 205 the planned change can include submitting the planned change to a network automation system such as network automation system 100 (FIG. 1). Various factors can contribute to the desired planned change, including those deemed to be business drivers 210 or technology drivers 215. Examples of business drivers 210 include changes to the business environment such as the need to provide different or additional services to clients. Examples of technology drivers 215 include software updates for existing network devices as well as new network devices that replace or augment the existing network devices.

In an optional step, the user can decide 220 whether to override the functions of the network automation system, such as verifying policy compliance, in order to implement the planned change completely manually without the inherent benefits of the network automation system. If the user opts to implement the planned change through the network automation system, the method 200 continues with the steps illustrated in FIG. 3, discussed below. Otherwise, the user connects 225 to a device proxy, such as device proxy 115 (FIG. 1). The device proxy next optionally determines 230 whether the user has the necessary permission to perform an override. This permission can be obtained, for instance, from a user permissions manager 130 (FIG. 1) through a policy module 110 (FIG. 1).

If the user does not have the necessary permission, then the user is not allowed to continue. In some embodiments, the network automation system notifies the user that the permission is lacking. At this point the user can begin again and decide 220 to proceed according to the steps of FIG. 3, or the user can obtain the required permission and try the manual emergency override again.

If the user does have the necessary permission, then the override conditions are optionally documented 235 before the user manually implements 240 the planned change. While not essential, such documentation 235 can be beneficial, for example, for reconstructing the network infrastructure should the need arise after the user implements 240 the planned change.

FIG. 3 illustrates a method 300 for implementing a planned change 140 (FIG. 1) according to an embodiment of the present invention. In those embodiments that provide for an override 220 (FIG. 2), the method 300 is a subsystem of the method 200, while in other embodiments method 300 stands alone. Method 300 begins with the user inputting 305 a planned change into the network automation system 100 (FIG. 1). The planned change can include either or both of manual and automated changes 155, 160 (FIG. 1).

In some embodiments, the user can optionally be prompted 310 to enter an additional change. In these embodiments, the user can be prompted 315 to specify whether the additional change will be implemented manually or as an automated change. If manual, the user inputs 320 a manual change, and if automated, the user inputs 325 an automated change. The change is added to the planned change and the method returns to prompting 310 the user to enter an additional change.

When the user has no further changes to add to the planned change, manual changes of the planned change are modeled 330, for example, by one or more of the software components 105 (FIG. 1). Modeling 330 the manual changes allows conflicts between the various changes to be identified 335, again by software components 105, for example. In this way conflicts between different manual changes, and conflicts between manual and automated changes can be identified. If a conflict is identified, the user can be alerted. In this situation the method 300 returns to the user to either resolve the conflict or, if deemed to be insignificant, in some embodiments the conflict can be flagged to be ignored when the planned change is resubmitted. In some embodiments, alerting the user includes suggesting a resolution to the conflict.

If no conflicts are identified 335, then method 300 proceeds to schedule 340 the implementation of the planned change. In some embodiments, the planned change, including both automated changes and the manual changes, can be displayed to the user in a planned activity view, for example, with a Calendar UI. This can be performed by the software components 105 in some embodiments.

Thereafter, automated changes are implemented 345, for example, by deployment engine 120 (FIG. 1). Implementation 345 of the automated changes can include verifying that the automated changes comply with policies and the like, for instance, through the use of policy module 110 (FIG. 1). If an automated change does not comply with a policy or other limitation, the method 300 can return to the user with a notification concerning the lack of compliance. In some instances, the notification will include a suggested remedy.

The manual changes of the planned change can also be implemented, though manually by the user. Here, the user connects 350 to a device proxy, such as device proxy 115 (FIG. 1). As above, the policy module can be used to verify that the manual changes comply with policies and the like through the use of the policy module 110. If a manual change does not comply with a policy or other limitation, the method 300 can return to the user with a notification concerning the lack of compliance. Again, the notification can include a suggested remedy. It will be appreciated that any type of policy can be applied to a manual change. For example, a user making manual change can be restricted in the commands that can be run based on the user's privileges. Additionally, a manual change that results in a configuration difference can be compared to the "expected" configuration difference, and various responses or alerts can be sent to the user in the case of a variance.

Devices that do not comply with a policy or process control can be detected via searches, events and reports.

It should be noted that in order to ensure that all manual changes are routed through the device proxy, it may be necessary to restrict direct user login to network devices. This can be achieved in a number of ways, such as Access Control Lists on the managed devices, appropriate protocol restrictions at choke-points in the network, limiting knowledge of device login credentials, and so forth.

In the foregoing specification, the invention is described with reference to specific embodiments thereof, but those skilled in the art will recognize that the invention is not limited thereto. Various features and aspects of the above-described invention may be used individually or jointly. It will also be recognized that the described software modules can be combined or further segmented. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art. Also, "software," "module," and "engine" are also terms used interchangeably herein.

What is claimed is:

1. A method for implementing changes to a network infrastructure, the method comprising:
   specifying a planned change including a manual change and an other change to the network infrastructure;
   modeling the manual change responsive to the specifying via modeling software;
   checking for a conflict between the manual change and the other change via conflict identification software;
   verifying that the manual change and the other change comply with a policy via a policy module;
   connecting, based on detecting no conflicts during the checking, a user to a device proxy providing an interface through which the user enters the manual change;
   implementing the planned change based on post conflict check entry of the manual change to the device proxy; and
   providing a manual emergency override configured to bypass the policy module and the modeling and conflict identification software.

2. The method of claim 1 wherein the other change is an automated change.

3. The method of claim 2 wherein implementing the planned change includes verifying that the automated change complies with a policy.

4. The method of claim 1 further comprising, after checking for the conflict, notifying a user of the conflict.

5. The method of claim 4 further comprising, after notifying the user of the conflict, allowing the user to flag the conflict to be ignored.

6. The method of claim 1 wherein implementing the planned change includes restricting a user's ability to implement the manual change based on the user's privilege level.

7. The method of claim 1 further comprising displaying the planned change to a user.

8. The method of claim 7 wherein the displaying the planned change includes using a Calendar UI.

9. The method of claim 1, further comprising passing the entered manual change from the device proxy to one or more network devices.

10. The method of claim 1, further comprising:
    detecting a conflict between the manual change and the other change;
    deeming the detected conflict to be insignificant; and
    flagging the conflict to be ignored when the planned change is resubmitted.

11. A network automation system comprising:
    storage comprising modeling and conflict identification software configured to model a manual change of a planned change and identify a conflict between the manual change and an other change of the planned change;

wherein said storage further comprises a policy module configured to verify that the manual change and the other change of the planned change conform to a policy;

wherein said storage further comprises a device proxy configured to connect to a user based on not identifying a conflict between the manual change and the other change, and to allow a user to implement the manual change to a network infrastructure;

wherein said storage further comprises a manual emergency override configured to bypass the policy module and the modeling and conflict identification software.

12. The network automation system of claim 11 wherein the software configured to identify the conflict is further configured to notify a user.

13. The network automation system of claim 11 further comprising a user permissions manager in communication with the policy module.

14. The network automation system of claim 11 further comprising a workflow process and approval engine in communication with the policy module.

15. The network automation system of claim 11 further comprising a deployment engine for implementing an automated change of the planned change.

16. The network automation system of claim 11, wherein the modeling and conflict identification software is configured to ignore a previously detected conflict on resubmission of the planned change based on the conflict being deemed insignificant.

* * * * *